US008753451B2

(12) United States Patent
O'Brien et al.

(10) Patent No.: US 8,753,451 B2
(45) Date of Patent: Jun. 17, 2014

(54) FUEL AND FUEL TANK TREATMENT

(75) Inventors: Stephen Gerard O'Brien, Surrey Hills (AU); Peter Francis Wagner, Dunsborough (AU); Robert James Moore, Colyton (AU)

(73) Assignee: Leighton O'Brien Pty. Ltd. (AU)

( * ) Notice: Subject to any disclaimer, the term of this patent is extended or adjusted under 35 U.S.C. 154(b) by 922 days.

(21) Appl. No.: 12/741,196

(22) PCT Filed: Aug. 20, 2008

(86) PCT No.: PCT/AU2008/001218

§ 371 (c)(1),
(2), (4) Date: Jul. 6, 2010

(87) PCT Pub. No.: WO2009/055836

PCT Pub. Date: May 7, 2009

(65) Prior Publication Data

US 2011/0094539 A1 Apr. 28, 2011

(30) Foreign Application Priority Data

Nov. 2, 2007 (AU) ................................ 2007906092

(51) Int. Cl.
*B08B 9/08* (2006.01)
*B01D 36/04* (2006.01)

(52) U.S. Cl.
USPC .................. 134/22.1; 134/166 R; 134/169 C; 210/801; 210/802

(58) Field of Classification Search
CPC ...... B08B 9/08; B08B 9/0821; B08B 9/0933; C10L 2290/00; C10L 2290/10; B09B 2220/10; B67D 7/00; B67D 7/76; B01D 21/00; B01D 21/24; B01D 21/2444
USPC .......... 134/22.1, 166 R, 169 C; 210/801, 802
See application file for complete search history.

(56) References Cited

U.S. PATENT DOCUMENTS 3,523,826 A * 8/1970 Lissant ...................... 134/22.12
3,954,611 A * 5/1976 Reedy ........................... 210/695

(Continued)

FOREIGN PATENT DOCUMENTS

| | | | |
|---|---|---|---|
| EP | 1243351 | | 9/2002 |
| EP | 1243351 | B1 * | 8/2007 |
| FR | 2757088 | A1 * | 6/1998 |
| JP | 2001-239111 | | 9/2001 |

OTHER PUBLICATIONS

EP1243351B1—Machine Language Translation.*
FR2757088—Machine Translation, Jun. 1998.*

*Primary Examiner* — Michael Kornakov
*Assistant Examiner* — Marc Lorenzi
(74) *Attorney, Agent, or Firm* — Galbreath Law Offices, P.C.; John A. Galbreath

(57) ABSTRACT

Liquid hydrocarbon storage tanks are cleaned by transferring the most contaminated lower fuel layer to an external vessel on a treatment truck where separation into a contaminants portion and a fuel portion occurs. The remnant fuel in the storage tank is cleaned by multiple passes through an external circuit on the truck. The fuel from the vessel is sometimes returned to the remnant fuel to be cleaned. The contaminants are discarded. The initial separation shortens the cleaning cycle. A flexible dip tube stiffened by a guide rod allows probing of the storage tank floor.

9 Claims, 7 Drawing Sheets phase 3

(56) References Cited

U.S. PATENT DOCUMENTS

| | | | | | |
|---|---|---|---|---|---|
| 4,361,488 | A | * | 11/1982 | White et al. | 210/776 |
| 4,364,743 | A | * | 12/1982 | Erner | 44/388 |
| 4,784,751 | A | | 11/1988 | McGehee | |
| 4,897,205 | A | * | 1/1990 | Landry | 210/766 |
| 5,078,799 | A | * | 1/1992 | Matter et al. | 134/22.18 |
| 5,098,580 | A | * | 3/1992 | Andersen | 210/745 |
| 5,409,025 | A | * | 4/1995 | Semler et al. | 134/111 |
| 5,776,257 | A | * | 7/1998 | Arnold et al. | 134/11 |
| 5,897,767 | A | * | 4/1999 | Patel | 208/13 |
| 6,041,793 | A | * | 3/2000 | Miyasaki | 134/22.1 |
| 6,069,002 | A | * | 5/2000 | Powell, Jr. | 435/264 |
| 6,485,652 | B1 | * | 11/2002 | Le Poder et al. | 210/713 |
| 6,568,610 | B1 | * | 5/2003 | Ericksen | 239/588 |
| 2002/0017313 | A1 | * | 2/2002 | Briggs | 134/10 |
| 2006/0037919 | A1 | | 2/2006 | Lara | |
| 2006/0231501 | A1 | * | 10/2006 | Sundeng | 210/745 |
| 2008/0023039 | A1 | * | 1/2008 | Hancock | 134/22.18 |
| 2008/0053484 | A1 | * | 3/2008 | Smith | 134/22.1 |
| 2009/0173363 | A1 | * | 7/2009 | Wahnich | 134/22.18 |

* cited by examiner phase 1 phase 3 phase 4 phase 5

FUEL AND FUEL TANK TREATMENT

FIELD OF THE INVENTION

This invention concerns a method and apparatus for cleaning the interiors of hydrocarbon storage tanks and the stored fuel therein.

BACKGROUND OF THE INVENTION

Hospitals, schools, prisons, call centres and the like have emergency power generators usually driven by diesel engines. The fuel for such engines must be stored onsite usually in subterranean tanks. Over time the fuel deteriorates and eventually so does the tank interior. Tank rust, fuel polymerisation, condensation and the growth of organisms in the fuel present problems which worsen as time goes by and unless the tank condition is monitored regularly the problems go unnoticed until the emergency power generators fail to start or stop after a brief run. Such tanks range in volume to 110,000 liter but typically are about 40,000 liter.

Different but related problems face fuel sellers such as service stations when they wish to stock petrol/ethyl alcohol admixture. If the fuel contains water upon delivery or water content gradually increases by condensation or unintended ingress, the water will stay miscible with the alcohol phase until it reaches about 0.5% when 40-60% of the alcohol descends to the bottom of the tank and a layer with a reduced octane rating is created. Alcohol is a polar solvent which is corrosive and loosens deposits which may otherwise have remained stable. As the temperature falls increased phase separation is noticed. These changes emerge as a result of monitoring tank condition and thereby come to the attention of the service station operator.

Mineral oil based fuels tolerate sediment and even heavily contaminated tanks may still not cause fuel filter clogging. But if those types of tanks are to switch over to holding alcohol/petrol fuels they require prior treatment. In such tanks the contamination may be 1-10% by volume.

Analysis shows that tank sludge has the following composition:

| | |
|---|---|
| Microbes | 2% |
| Rust and solid sediment | 5% |
| Water | 11% |
| Polymerised fuel | 82% |

U.S. Pat. No. 5,409,025 describes a pumping apparatus specifically for filtering particulate materials from hydrocarbon fuel in underground storage tanks. Pumping and filtering the contaminated fuel is effective but the removal of particles down to a preselected size takes time and this prolongs the time when the tank is out of service.

SUMMARY OF THE INVENTION

A method of cleaning a storage tank interior and the stored liquid hydrocarbon fuel therein, comprising transferring the most contaminated lower fuel layer to an external vessel and separating the layer into a contaminants portion and a fuel portion, treating the remnant tank fuel by multiple passes through an external fuel cleaning apparatus, treating the fuel portion by multiple passes through the external fuel cleaning apparatus, optionally returning the fuel portion to the remnant tank fuel and discarding the contaminants.

The most contaminated layer is at the bottom of the tank. Once transferred from the storage tank this layer is allowed to separate by gravity into a heavier water layer containing solids and a lighter hydrocarbon layer also containing solids. The settlement stage is conducted while the remnant fuel in the tank is treated. This permits parallel processing, saves time and reclaims usable fuel. In use a dip tube is inserted into the tank at the lowest point and the lowermost layer is pumped into the external vessel which may be a mobile container such as a truck mounted tank. The vessel may be of 1-2000 liter capacity.

A biocide and/or a detergent may be added to the remnant fuel. The detergent is intended to loosen films of biological material adhering to the tank surface. This material joins the remnant fuel as a suspension. The dirty fuel may be subjected to a vortex flow in order to remove water and suspended solids such as floating colonies of fungus or bacteria.

The dirty fuel may be subjected to a coalescer which assists in clumping suspended solids. It may also be subjected to a magnetic field which improves the physical condition of the fuel. The effects of magnetic fields on hydrocarbon fuels are described in the literature.

The apparatus aspect of the invention provides a mobile installation for treatment of storage tanks and fuel stored therein, comprising a vessel which is capable of holding the most contaminated portion of the stowed fuel, a pump and a circuit with fuel conditioning the remnant stored fuel while the vessel contents are processed.

The circuitry and pump may be mounted above a bund arranged at floor level in order to prevent ground spillage.

The bund may have a spillage detector capable of arresting the pump. The installation may have a fire detection device which stops the operation in the event of fire. The method and apparatus are applicable to a variety of fuels including E10, PULP and ULP.

BRIEF DESCRIPTION OF THE DRAWINGS

One embodiment of the invention is now described with reference to the accompanying drawings, in which.

DETAILED DESCRIPTION WITH RESPECT TO THE DRAWINGS

Figure 1:
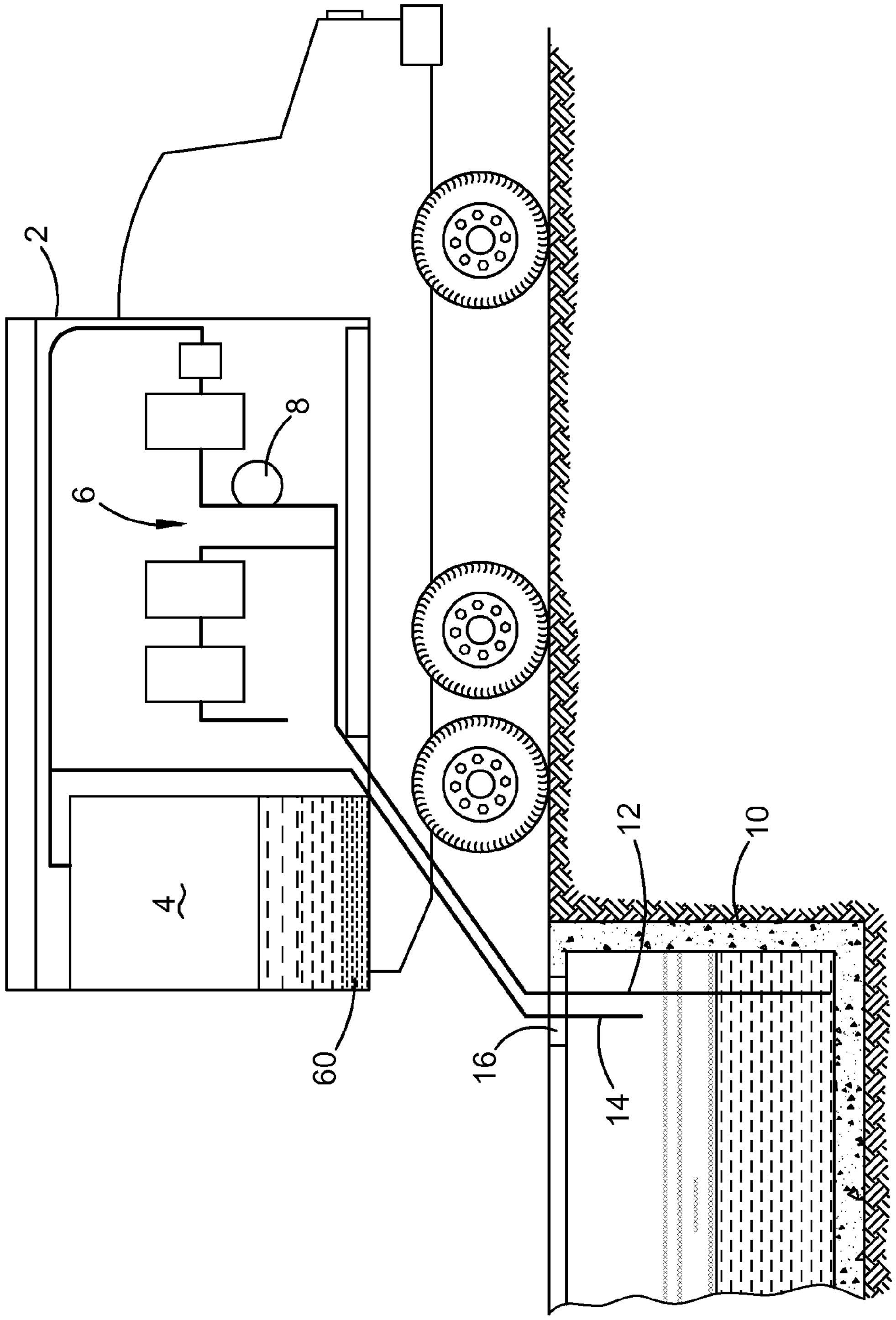
FIG. 1 is a diagram of a vehicle containing a settlement vessel and a treatment circuit.
Figure 2:
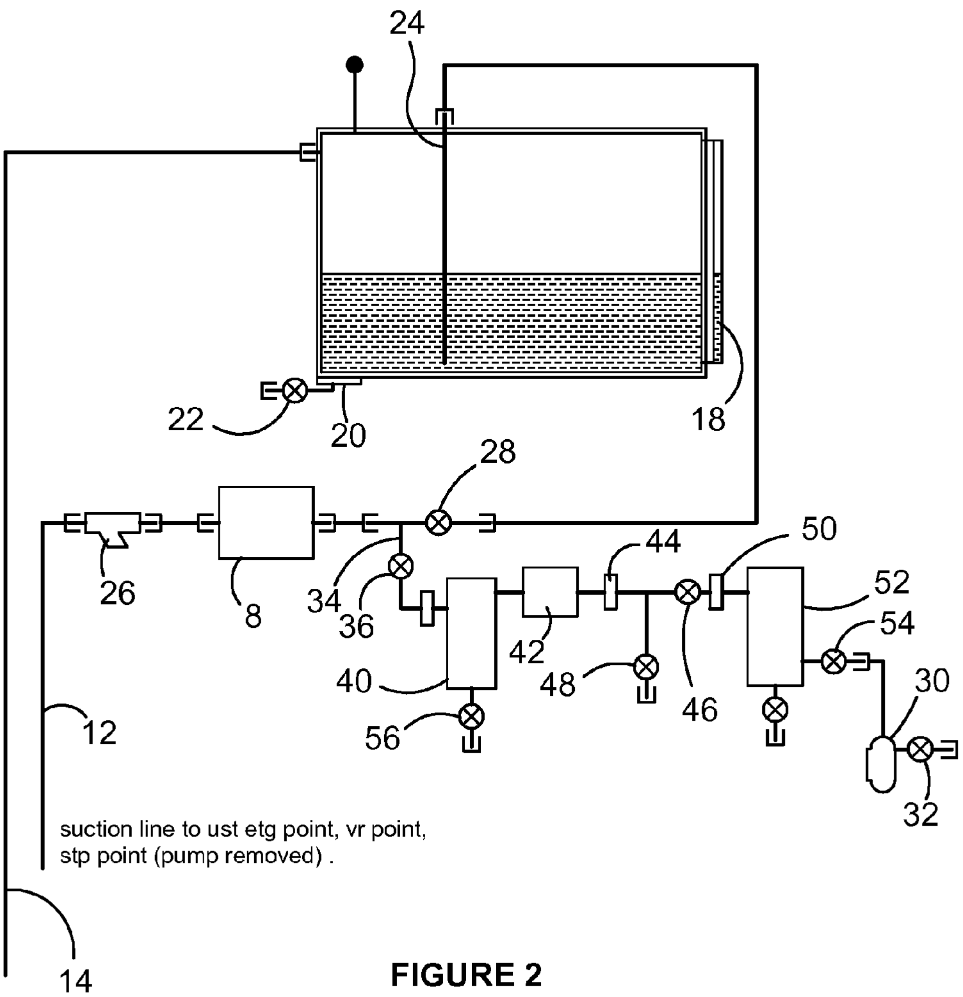
FIG. 2 is a diagram of the components of the treatment circuit with the settlement vessel connected to an underground storage tank via a lift tube and a return tube.

Referring firstly to FIGS. 1 and 2, truck body 2 contains a 2000 liter capacity vessel 4 and liquid circuit 6. Pump 8 in the circuit lifts liquid hydrocarbon, namely stored diesel fuel from underground storage. Tank 10 via lift tube 12 and return tube 14. The underground storage tank is of 42,000 liter capacity and supplies emergency generators intermittently which tends to allow deterioration in the fuel. The fuel slowly polymerises spontaneously, any inclusions in the fuel which arrived at delivery sink to the tank floor or occupy the lower layer in the tank. Microbes establish themselves assisted by water which may be present at delivery or leak into the tank subsequently.

The cleaning program is initiated by taking a sample of the underground tank contents and observing the colour and the extent and nature of the contamination.

Phase 1

Dip tube 12 is inserted through the hatch 16 to the tank floor in order to raise dirt, sludge and water into vessel 4. The transfer rate of diaphragm pump 8 is adjusted to be somewhat less than the capacity of the return hose 14. Air displaced from vessel 4 as it fills is directed into the tank 10. When the second sample indicates the sludge has been transferred, the pump stops. Level gauge 18 tells the operator how full the vessel is. The vessel can be flushed and drained through outlet 20 and valve 22 but day to day operational filling is done through dip tube 24. On the way to the vessel the contaminated fuel passes through a magnetic Y-strainer 26, valve 28 and flow meter 30 from which samples can be taken using valve 32. The contents of vessel 4 are allowed to settle.

Phase 2

Magnetic strainer 26 is intended to function primarily as part of the fuel treatment circuit 6 which receives pump output through branch 34. Valve 36 allows flow through bolted flange connector 38, water separator 40, detergent dispenser 42 and bolted flange connector 44. The latter converts flow either to valve 46 or to branch valve 48, flange connector 50 and filter chamber 52. If the fuel is destined for alternative storage capacity it leaves filter chamber 52 through valve 54. In phase 2 the fuel is continuously re-circulated from the underground tank through the water separator 40, the detergent dispenser 42 and the empty filter chamber. The vortex created in the water separator coalesces water droplets allowing them to separate and drain through valve 56. The detergent acts upon the interior surface of the tank 10 loosening deposits of rust or biological material with the assistance of the rinsing action of the fuel coursing through the tank between the dip tube 12 and return tube 14. Samples are taken (see FIG. 3) through the sample port and flow meter connected to valve 48 until the remnant fuel reaches the purity set by the program. This varies according to the age of the fuel and other factors, for example the ingress of water and the prevailing temperature. In this treatment phase, which may last 2-5 hours, the magnetic strainer is able to reverse the polymerisation of the fuel and the detergent exerts a biocidal effect on the bacteria and algae.

Figure 3:
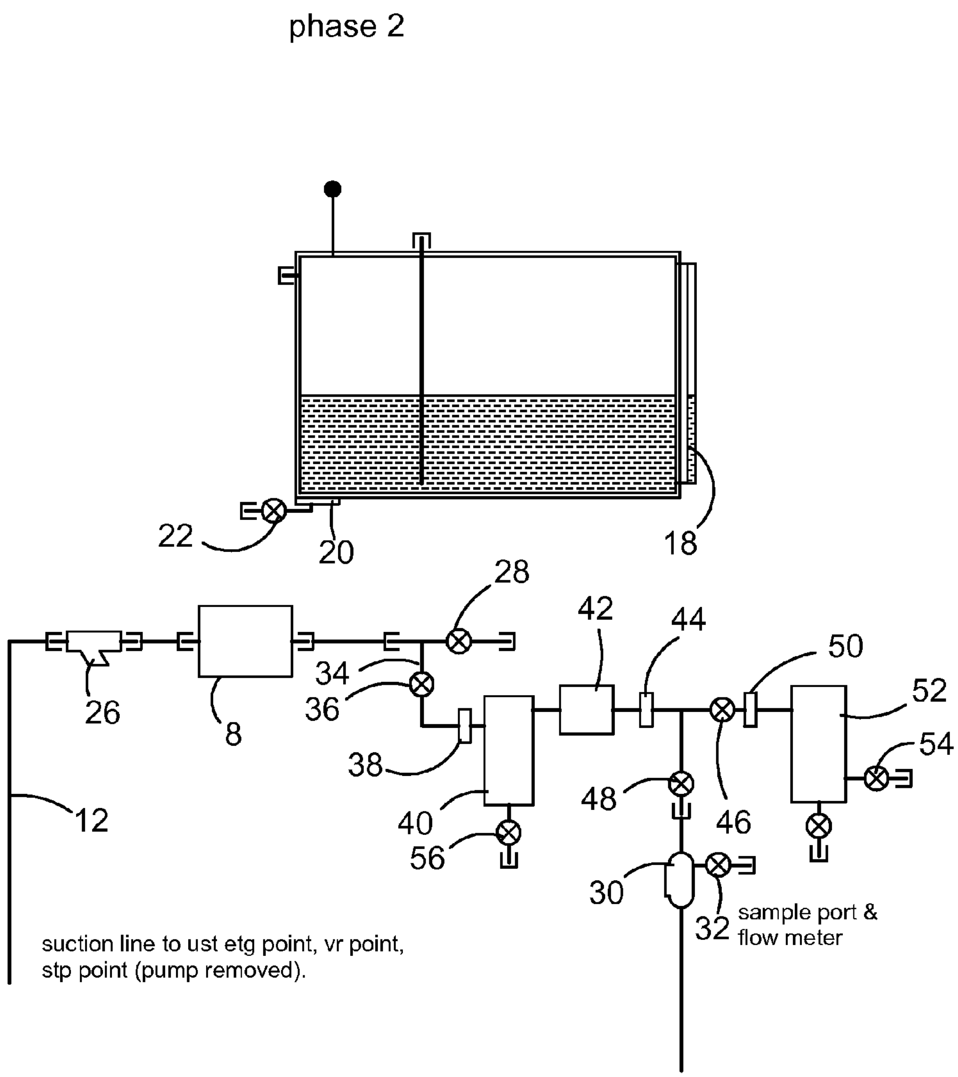
FIG. 3 is the circuit of FIG. 2 arranged for treatment of the remnant fuel in the underground storage tank while settlement occurs in the vessel.

FIG. 3 shows that it is possible to bypass the filter 52 and attach the return tube to valve 48.

Phase 3

Settlement in vessel 4 continues. Return tube 14 is switched to exit valve 54 and the sample point and flow meter detect greater fuel clarity as the filter removes inclusions larger than 2 μm.

Phase 4

Figure 5:
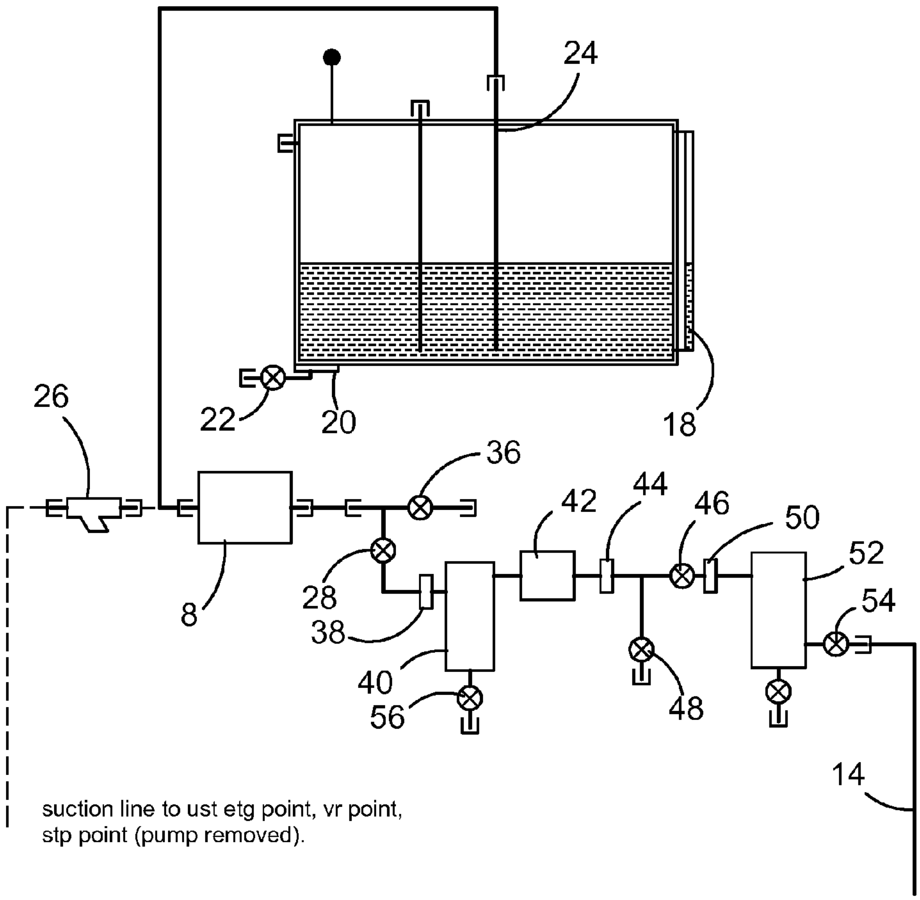
FIG. 5 is the circuit of FIG. 2 arranged for treating fuel in the vessel.
Figure 6:
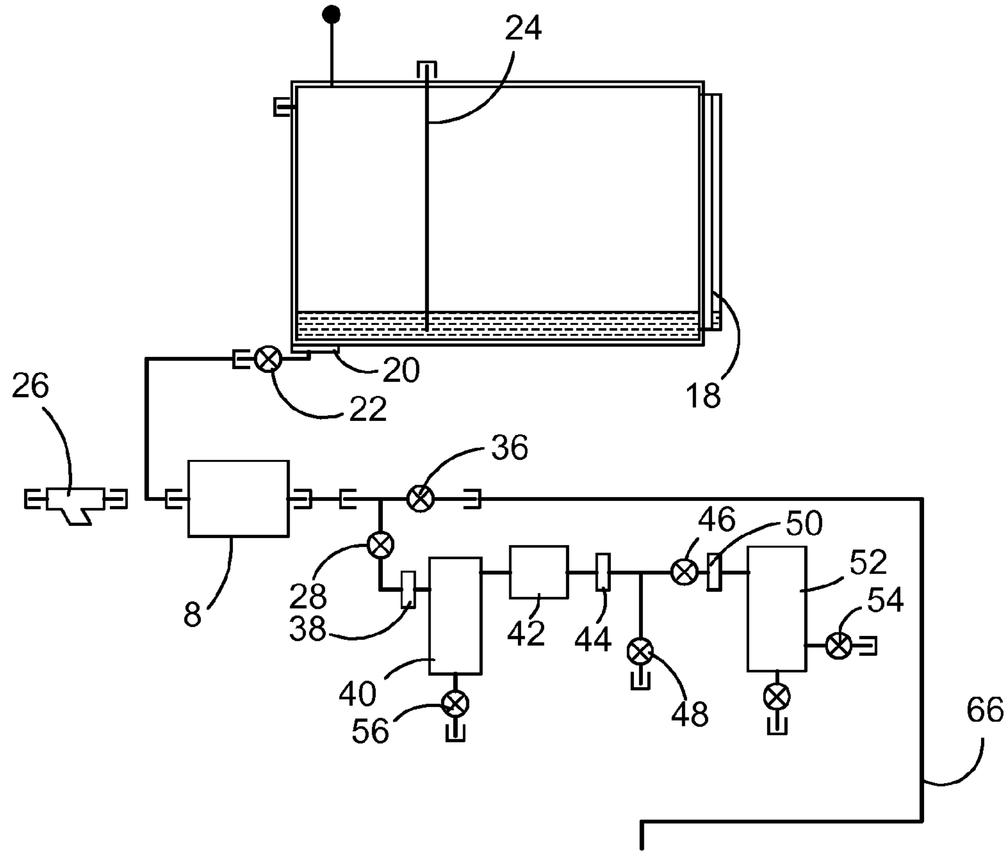
FIG. 6 is the circuit of FIG. 2 arranged to drain waste from the vessel.
Figure 7:
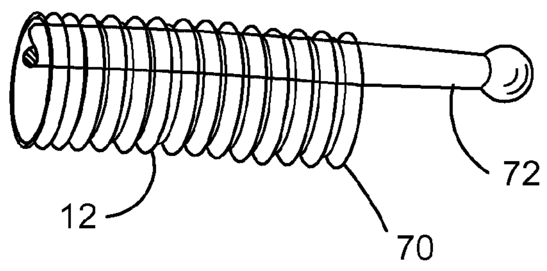
FIG. 7 is a side view of a fragment of dip tube and control rod.
Figure 8:
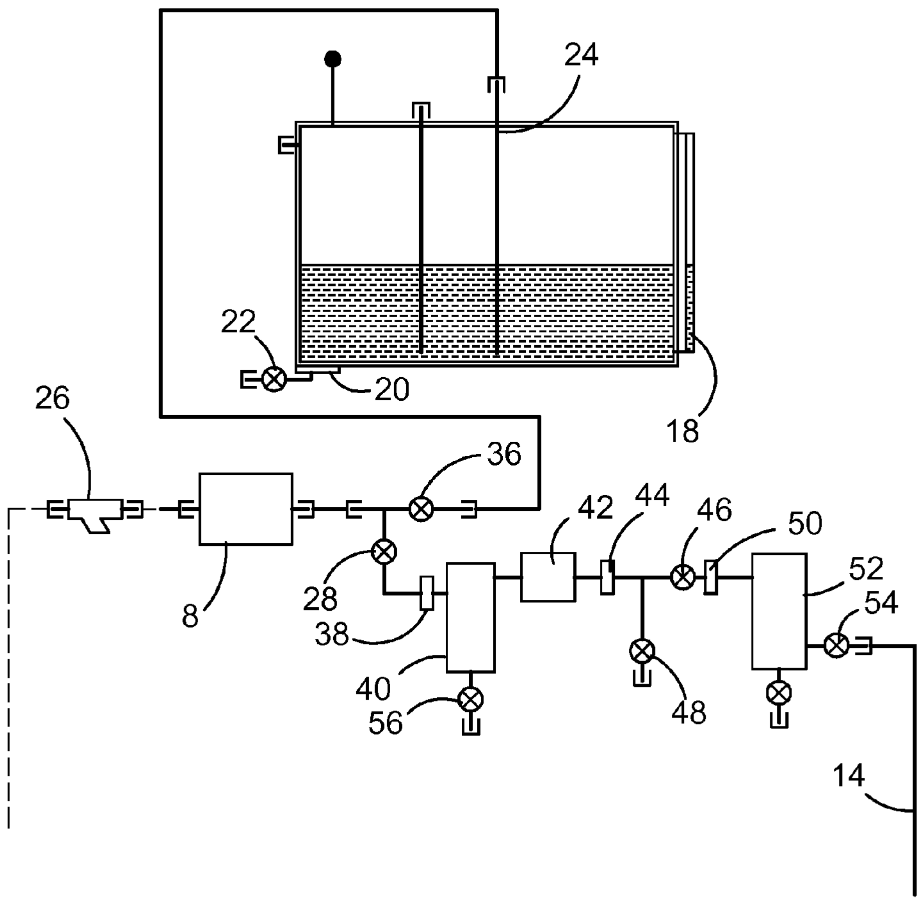

Magnetic strainer 26 is disconnected from the pump circuit and the pump 8 is reconnected to a height adjustable dip tube 24 in the vessel 4. In this phase the fuel floating above the sludgy layer 60 is drawn off and passed in series through the components shown in FIG. 5. The cleaned fuel may be returned to the tank or sent to alternative storage capacity because this fuel is not circulated.

Figure 4:
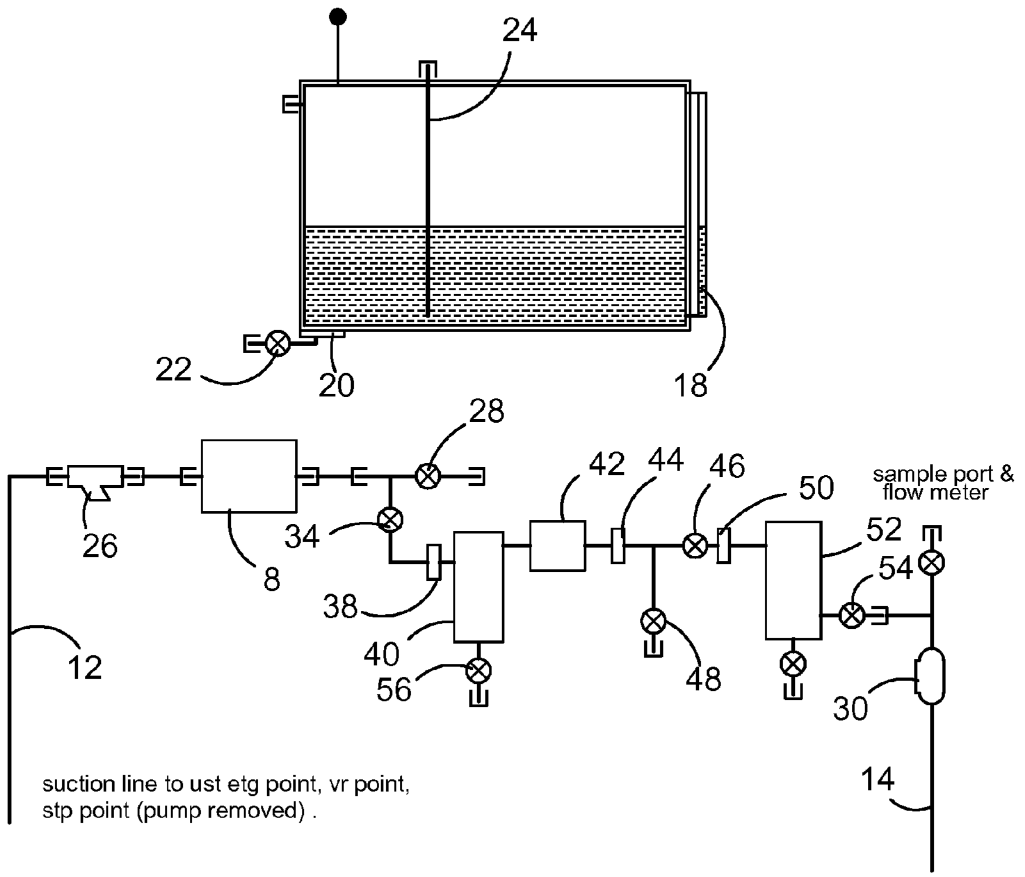
FIG. 4 is the circuit of FIG. 2 arranged for full filtration of the remnant fuel.

In a variant procedure, the sludgy layer is drained through outlet 20 via valve 22 until the supernatant fuel reaches the vessel floor. Dip tube 24 is adjusted to reach the floor and is connected to lift tube 12 while return tube 14 (see FIG. 4) sends fuel to the vessel. The supernatant fuel can then be re-circulated through the components.

Phase 5

Dip tube 12 is disconnected from the pump. The pump input is connected instead to drain valve 22. The fuel treatment components are isolated by valve 36 and valve 28 sends the pump output through line 66 to waste collection drums (not shown). These are of 205 l capacity and suitable for the carriage of such waste on a truck under dangerous goods provisions.

All the phases of the operation must be performed with care to avoid fuel spillage and spark generation. The spillage risk is reduced by incorporating a bund 68 in the truck body of a capacity somewhat larger than the vessel capacity.

All the phases of the operation must be performed with care to avoid fuel spillage and spark generation. The spillage risk is reduced by incorporating a bund 68 in the truck body of a capacity somewhat larger than the vessel capacity.

Example 1

A 31,000 liter tank with only light contamination required 1 hour 40 minutes to transfer and treat the most contaminated 1,500 liter fraction. Filtration of 15,023 liter of the remnant fuel took 3 hours 20 minutes and collected 50 liter of liquid waste.

Example 2

Treatment of the same sized tank but with heavy contamination required 2 hours 15 minutes to separate the most contaminated 1,900 liter fraction. Filtration of the 31,626 liter remnant fraction took 9 hours 45 minutes and collected 580 liter of liquid waste.

The 25 mm dia. dip tube 12 is made of PVC and strengthened by circumferential ribs 70.

As the tube is coiled on a drum, a residual curvature tends to remain which can interfere with insertion into the duct leading into the tank, moreover it may also curl when dipping into the contents of the tank. Greater control is possible if a fibreglass control rod 72, 3-4 m long and 8 mm in dia. is inserted into the entrance of the dip tube. Once the rod is inside the dip tube, it straightens the dip tube and simplifies insertion, removal and probing.

We have found the advantages of the above embodiment to be:

1. Sludge, bio film and microbes are removed from the tank interior surface.
2. Fewer filters are necessary.
3. Sediment, rust and water whether free or combined is removed.
4. The waste fraction from the operation can be transported in drums in a safe, approved manner.

It is to be understood that the word "comprising" as used throughout the specification is to be interpreted in its inclusive form, ie. use of the word "comprising" does not exclude the addition of other elements.

It is to be understood that various modifications of and/or additions to the invention can be made without departing from the basic nature of the invention. These modifications and/or additions are therefore considered to fall within the scope of the invention.

The invention claimed is:

1. A method of cleaning a storage tank interior and the stored liquid hydrocarbon fuel therein, comprising the steps of:

first transferring a contaminated lower fuel layer from the storage tank to an external vessel, where the contaminated lower fuel layer is allowed to further separate by gravity into a lower contaminants portion and an upper fuel portion, while the contaminated lower fuel layer separates in the external vessel, treating remnant tank fuel remaining in the storage tank by multiple passes through an external fuel cleaning apparatus, said remnant tank fuel bypassing the external vessel while being treated, after completing treatment of the remnant tank fuel, treating the fuel portion of the external vessel by multiple passes through the external fuel cleaning apparatus, and discarding the contaminants portion.

2. A method as claimed in claim 1, wherein the remnant tank fuel is returned from the external fuel cleaning apparatus to the storage tank.

3. A method as claimed in claim 1, wherein the remnant tank fuel is subjected to a magnetic field after leaving the storage tank.

4. A method as claimed in claim 3, wherein the remnant tank fuel is subjected to water separation after leaving the storage tank.

5. A method as claimed in claim 4, wherein the remnant tank fuel is subjected to detergent dosing after leaving the storage tank.

6. A method as claimed in claim 5, wherein the remnant tank fuel is subjected to filtration for inclusions larger than 2 μm.

7. A method as claimed in claim 1, wherein the fuel portion of the external vessel is subjected to water separation, detergent dosing and filtration before being returned to the storage tank.

8. A method as claimed in claim 1, wherein the contaminated lower fuel layer is transferred from the storage tank to the external vessel by a flexible dip tube, the leading end of which is kept straight by a rod within the tube.

9. A method as claimed in claim 8, wherein the length of dip tube kept straight by the inserted rod is 3-4 m.

* * * * *